INVENTOR.
BRADFORD B. HOLMES

INVENTOR.
BRADFORD B. HOLMES
BY
Geo. G. Hyde
ATTORNEY

United States Patent Office 2,951,494
Patented Sept. 6, 1960

2,951,494

PRESSURE REGULATING VALVE

Bradford B. Holmes, New York, N.Y., assignor to The Bendix Corporation, a corporation of Delaware Filed July 25, 1955, Ser. No. 524,103

5 Claims. (Cl. 137—64)

This invention relates to valves, and is directed to a valve construction which will maintain uniform fluid pressure at the valve outlet regardless of varying rates of discharge. It is designed particularly for regulating the supply of oxygen for inhalation, and is suitable for use in resuscitation apparatus, oxygen supply systems for aviators and the like.

An object of the invention is to provide a novel valve construction for maintaining uniform outlet pressure. A further object is to provide such a valve which is adapted to supply oxygen, or a gas for inhalation containing oxygen, at uniform pressure during variations in the rate of gas flow corresponding to variations in the rate of inhalation.

Another object is to provide a novel valve construction in which the variation in the resistance to flow with changes in the rate of flow is approximately linear rather than quadratic. A related object is to provide a valve with a flow passage having approximately the characteristics of a capillary tube as distinguished from an orifice, but arranged for the flow of a substantial volume of gas.

In a preferred form a spring-actuated valve construction is employed, in which the spring pressure decreases as the valve opens and the spring expands, introducing a varying factor in the flow control. An object of the invention is to provide a novel arrangement that will compensate for this factor and maintain uniform discharge pressure.

In valves of this type, an increase in the rate of flow tends to produce an increase in the resistance to flow due to turbulence and friction. An object is to provide a valve arrangement which compensates for the tendency of such resistance to reduce the pressure at the discharge zone.

When the valve is used in resuscitators, it must conform to limited dimensions; and reduced size without sacrifice of efficient operation is also important when it is employed as a demand valve in oxygen regulators for aviators. An object of the invention is to provide a valve of the indicated type that is so constructed and arranged that an efficient embodiment may be made which is compact and small.

The foregoing and other objects and advantages of the invention will appear more fully from consideration of the detailed description which follows, in conjunction with the accompanying drawings wherein one embodiment of the invention is illustrated. It is to be expressly understood, however, that the drawings are for the purposes of illustration and description, and are not to be construed as defining the limits of the invention.

Figure 1:
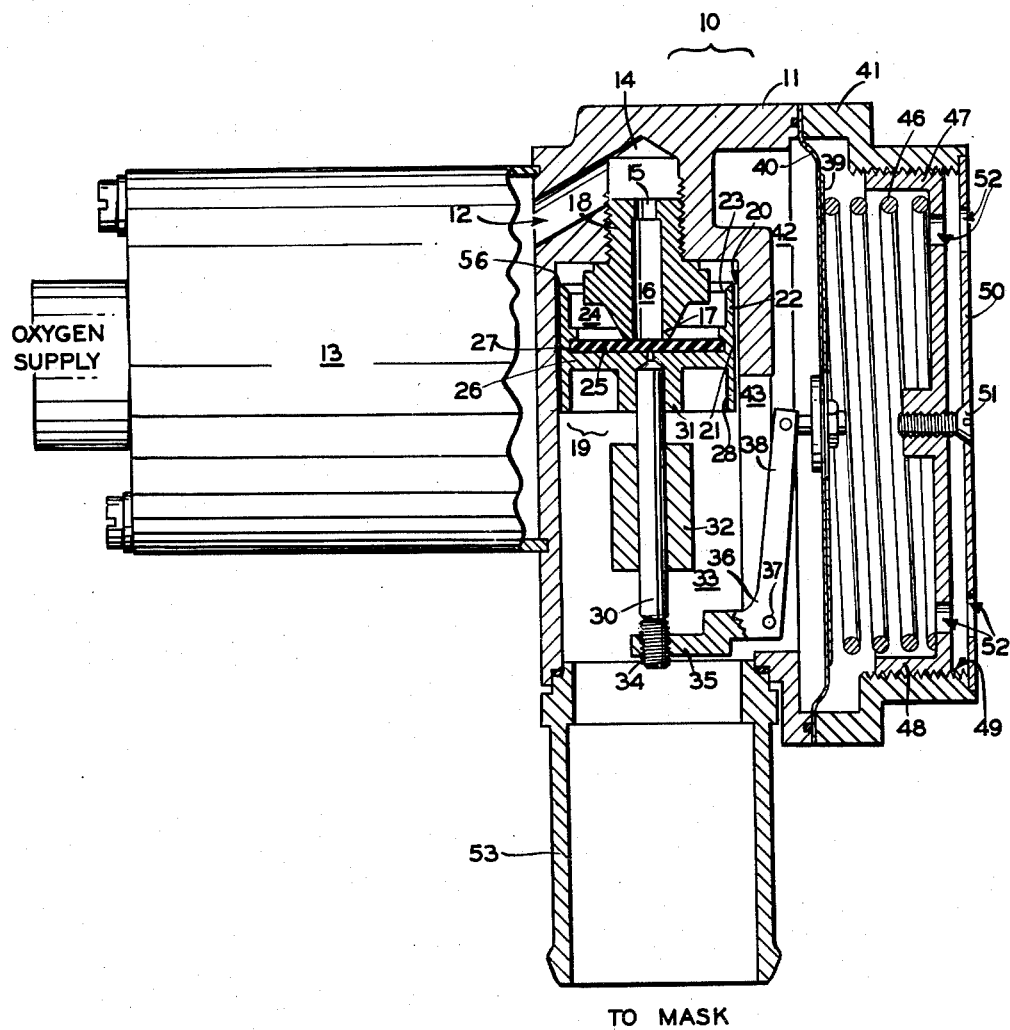
Fig. 1 is a central transverse sectional view of the valve, with the valve supply unit shown in elevation.
Figure 2:
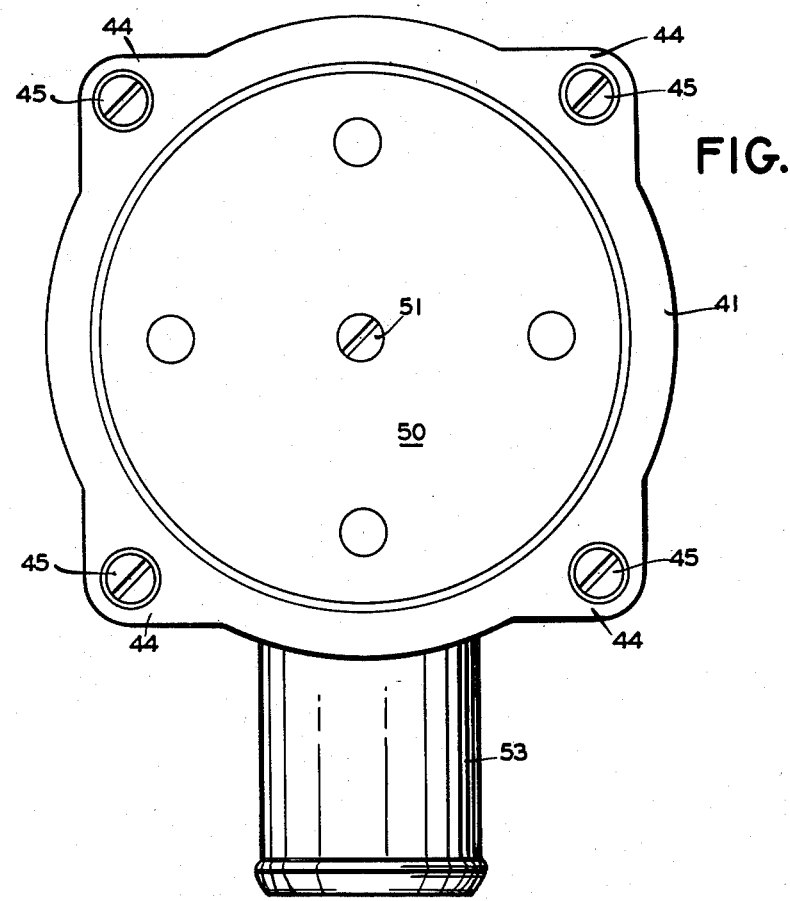
Fig. 2 is an end elevation of the valve from the right of Fig. 1.
Figure 3:
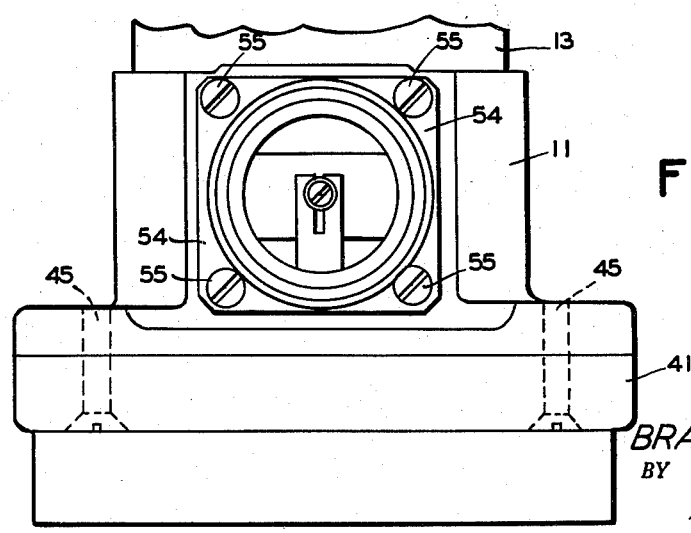
Fig. 3 is a side elevation of the valve from the bottom of Fig. 1.

The valve 10 comprises a casing body 11 provided with an inlet 12 for oxygen or other inhalable gas from a suitable supply unit 13, which maintains a supply of such gas at a uniform pressure. The unit 13 is preferably a pressure reducer of the type which maintains a fixed discharge pressure from a supply having a substantially varying higher pressure, and may advantageously be of the two-stage type shown in the patent application of the present inventor, Serial No. 299,352, filed July 17, 1952, and assigned to the assignee of the present application, now U.S. Patent No. 2,836,189, issued May 27, 1958. This pressure reducer will operate with input pressures which vary between 2000 p.s.i. and 50 p.s.i., maintaining a uniform discharge pressure, which in one successful embodiment is 40 p.s.i.

The gas from inlet 12 passes into a supply chamber 14, and thence through an orifice 15 to passage 16 extending through the valve seat 17. Seat 17 is advantageously of the tapered narrow edge type, and is incorporated in a removable seat plug 18 threaded into the body 11, the plug housing the orifice 15 and passage 16.

The valve head 19 is in the form of a piston slidable in a bore 20 in body 11. Head 19 includes cylindrical side wall 21 having an upper cylindrical skirt 22 with its upper edge 23 advantageously beveled inwardly, said skirt forming a wall of a pressure chamber 24 extending from head 19 around the valve seat 17 and into the upper end of bore 20. A washer 25 of suitable yieldable material is mounted on the upper face of transverse valve head wall 26, as by pressing the margin of the washer into a suitable recess 27 in the skirt 22. A lower cylindrical skirt 28 extends downwardly from the outer margin of wall 26 in alignment with skirt 22, forming part of wall 21. The latter wall is slightly spaced from the parallel wall of bore 20, as hereinafter set forth in detail.

Valve control mechanism is mounted in casing body 11 and engages valve head 19. In the form illustrated, a valve rod 30 having an upper end fitting within central boss 31 on valve head wall 26 is slidably mounted in cross-bar 32 fixed at its ends to the walls of discharge chamber 33, which forms a continuation of bore 20 and advantageously is similarly cylindrical in form. The outer end of rod 30 is engaged by mechanism for exerting inward pressure on said rod and valve head 19. As shown, a coaxial plug 34 with a rounded end movably bearing against said outer end of rod 30 is threaded through a split clamp end 35 of bell crank 36, mounted by pivot pin 37 on casing body 11 and having an arm 38 pivotally connected to a plate 39 clamped to diaphragm 40, which is marginally held between casing body 11 and casing cap 41. Body 11 is recessed along the adjacent face of diaphragm 40 to provide a pressure regulating chamber 42 communicating with discharge chamber 33 through an aperture 43 in which bell crank 36 may advantageously be mounted.

Casing cap 41 is generally cylindrical in form, and is suitably fixed to casing body 11, as by providing ears 44 clamped to said body by screws 45. Within cap 41 a spiral compression spring 46 bears against plate 39 and a retainer plate 47 having an inturned marginal flange 48 threaded in a bore 49 in cap 41. A face plate 50 set into cap 41 and overlying retaining plate 47 is held in place by screw 51, threaded into retainer plate 47 and serving also as a locking screw for said plate. The face plate 50 and retainer plate 47 are provided with apertures 52 communicating with the outer air.

A suitable arrangement may be provided for connecting the discharge chamber 33 with a breathing mask or the like. In the form shown a tubular hose connector 53 of well-known type is mounted on casing body 11 in communication with chamber 33, as by flange 54 and screws 55.

In operation, oxygen supplied to inlet 12 passes through aperture 15 and passage 16. The outlet chamber 33 is maintained at a predetermined pressure, one embodiment of the invention having a pressure of sixteen inches of water in this chamber. This pressure, exerted on diaphragm 40, is sufficient to overcome the pressure of spring 46 and raise the valve head 19 to closed position through the action of bell crank 36 when no oxygen is being withdrawn. Spring 46 is adjusted by rotating retainer plate 47 so that with the selected pressure present in chamber 33, there will be only a slight difference between the gas pressure and the spring pressure on opposite sides of diaphragm 40, one embodiment having a pressure difference equivalent to about one inch of water. This pressure must of course be sufficient to hold washer 25 firmly against seat 17.

When the pressure in chamber 33 drops slightly upon the commencement of a flow of gas through connector 53, normally due to the commencement of inhalation, spring 46 will operate to lower valve head 19, allowing gas to travel from passage 16 into pressure chamber 24 and thence around the periphery of cylindrical valve head 19 into discharge chamber 33. The clearance space 56 between the side wall 21 of valve head 19 and the face of bore 20 is carefully designed to provide capillary flow, and not a flow having the characteristics of flow through an orifice, the requirements for capillary flow under these conditions being known to those skilled in the art. In one practical embodiment of the invention a valve head 19 having a side wall 21 three-quarters of an inch in diameter, and a clearance space one sixty-fourth of an inch in radial dimension, was found to provide a flow having the requisite characteristics when the valve was designed for an input pressure of 40 p.s.i. and a flow varying from 5 to 100 liters per minute.

With a valve designed in this manner, under low flow conditions the pressure in discharge chamber 33 will be substantially the same as that in pressure chamber 24. As the flow increases with increased withdrawal from chamber 33 the corresponding increase in resistance to flow through the relatively narrow clearance space 56 will result in a slight pressure drop in chamber 33. However, when a pressure difference develops between chambers 24 and 33 the higher pressure in chamber 24 will act on the piston-like valve head 19 to force the head outwardly, producing a larger valve opening and a correspondingly greater flow of gas, which will raise the pressure in chamber 33 to the desired discharge value. This automatic adjustment of the valve head 19 will take place in accordance with the rate of withdrawal of gas from chamber 33, and will maintain uniform pressure in the latter chamber.

This piston movement of valve head 19 compensates for another factor. As valve head 19 moves outwardly, and bell crank arm 38 is swung laterally, the pressure of spring 46 will decrease as the spring expands. However, since this will result in a corresponding additional outward shift of valve head 19 against the spring pressure, a sufficient additional flow will result to compensate for the drop in spring pressure.

As the rate of gas withdrawal in chamber 33 decreases, as in the latter stages of a single inhalation, the operation will be reversed, the increasing pressure in chamber 33 forcing diaphragm 40 laterally, moving valve head 19 inwardly until, upon substantial termination of said withdrawal, the washer 25 will be forced against valve seat 17, cutting off the flow of oxygen until the next period of gas withdrawal.

It has been found that the valve is highly effective under properly restricted conditions. With the proper diameter of valve head 19 and width of clearance space 56, the rate of increase of pressure in pressure chamber 24 will be substantially linear with increasing flow rather than quadratic. The flow, moreover, will not be affected by changes in altitude. It has also been found desirable to maintain only a relatively slight pressure differential between the pressure chamber 24 and the discharge chamber 33 in order to avoid fluttering or "motorboating." Moreover, the maximum flow must be limited to a value not substantially greater than that for which the valve is designed, since in the absence of some such limitation the valve might be forced into wide open position, which would prevent it from functioning in the manner indicated. This is the purpose of providing orifice 15, which should be designed so that it will prevent any flow exceeding the maximum flow for which the valve is designed by more than about 25%.

It will also be noted that by positioning the diaphragm and spring laterally with relation to the valve, it is possible to provide a compact but efficient unit, since the width of the diaphragm and spring is aligned with the length of the valve itself. This permits the use of a diaphragm of adequate diameter, and a spring of suitable size. It also facilitates the provision of a simple housing, with a cap 41 which clamps the diaphragm in place and gives ready access to the moving parts for adjustment, repair or replacement.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A gas pressure regulating valve unit including a housing having an inlet, a discharge chamber and a valve bore, and means for maintaining substantially uniform pressure in the discharge chamber with varying rates of gas withdrawal, comprising a valve seat surrounding the inlet, an associated valve head movably mounted in the bore and defining a pressure chamber in the bore surrounding said seat, means for varying the position of the valve head relative to the seat in accordance with variations in the pressure in the discharge chamber, and means having the characteristics of a capillary duct for flowing gas from the pressure chamber to the discharge chamber at a rate varying substantially linearly with variations in the pressure in the discharge chamber.

2. A gas pressure regulating valve unit including a housing having an inlet, a discharge chamber and a valve bore, and means for maintaining substantially uniform pressure in the discharge chamber with varying rates of gas withdrawal, comprising a valve seat surrounding the inlet, an associated valve head movably mounted in the bore and forming a piston defining a pressure chamber in the bore surrounding said seat and connected to the discharge chamber by a passage having the characteristics of a capillary passage formed by the space between the valve head and the valve bore, and means for varying the position of the valve head relative to the seat in accordance with variations in the pressure in the discharge chamber.

3. A gas pressure regulating valve including a housing having an inlet, a discharge chamber and a valve bore, and means for regulating the pressure in the discharge chamber, comprising a valve seat surrounding the inlet, a valve head movably mounted in the bore and having a recess defining a pressure chamber surrounding said seat, and means for regulating the movement of said valve head, comprising a restricted passage between said valve head and said bore connecting the pressure chamber with the discharge chamber, a diaphragm having a face laterally offset from said bore and movable substantially transversely to the direction of the movement of said head, said discharge chamber being connected with a compartment extending across said diaphragm face, a compression spring bearing against the opposite face of said diaphragm, and an operating linkage connecting said diaphragm and the valve head.

4. A gas pressure regulating valve unit including a housing having a body provided with a discharge chamber, an aligned valve bore, an inlet, and means for regulating the pressure in the discharge chamber, comprising a valve seat in the body surrounding the inlet and extending into an end of the bore, a valve head movably mounted in the bore and having a recess defining a pressure chamber surrounding said seat, said body including a restricted passage extending past said valve head between the pressure chamber and the discharge chamber, and means for regulating the movement of said valve head, including a housing cap mounted on the body at one side of the bore and discharge chamber and forming a compartment in the housing, a diaphragm extending across the compartment, a compression spring bearing against the cap and one side of the diaphragm, the other side of which is exposed to gas pressure in a portion of said compartment connected to the discharge chamber, and an operating linkage connecting said diaphragm to the valve head, arranged for movement of said head by movement of the diaphragm in response to the opposing forces of said spring and gas pressure.

5. A gas pressure regulating valve unit, comprising a housing including a body having an inlet, a discharge chamber and a valve bore aligned with said chamber and extending transversely to the body, and means for regulating the pressure in the discharge chamber, comprising a valve seat surrounding the inlet and extending into an end of the bore, a valve head having a side wall slidably fitting in said bore, said head defining a pressure chamber surrounding the valve seat, said wall and bore being slightly spaced to form a passage between the pressure chamber and the discharge chamber having the characteristics of a capillary passage, a housing cap attached to said body and enclosing a compartment laterally offset from the bore and discharge chamber, a diaphragm extending across said compartment and marginally held between said cap and body, a compression spring located within the cap and bearing against one side of the diaphragm, said body including a passage connecting the discharge chamber with said compartment at the other side of the diaphragm, a slidably mounted support for the valve head, and a bell crank pivotally mounted on the body and connecting said support and diaphragm.

References Cited in the file of this patent
UNITED STATES PATENTS

| | | |
|---|---|---|
| Re. 21,597 | Niesemann | Oct. 8, 1940 |
| 1,030,967 | Blanchard | July 2, 1912 |
| 1,934,832 | Temple | Nov. 14, 1933 |
| 2,192,327 | Palmer | Mar. 5, 1940 |
| 2,315,370 | Hughes | Mar. 30, 1943 |
| 2,627,703 | Spencer | Feb. 10, 1953 |
| 2,690,760 | Hughes | Oct. 5, 1954 |
| 2,729,236 | Valince | Jan. 3, 1956 |